United States Patent [19]
Emberson

[11] 3,921,661
[45] Nov. 25, 1975

[54] ADJUSTABLE DRAIN FITTING
[76] Inventor: John Ernest Emberson, 25 Dogwood Crescent, Scarborough, Ontario, Canada
[22] Filed: Dec. 18, 1974
[21] Appl. No.: 534,020

[52] U.S. Cl. .................................. 137/356; 285/3
[51] Int. Cl.² .......................................... F16L 5/00
[58] Field of Search ............... 285/2, 3, 4; 137/356

[56] References Cited
UNITED STATES PATENTS

| | | | |
|---|---|---|---|
| 875,729 | 1/1908 | O'Brien | 285/3 |
| 880,302 | 2/1908 | Heineman et al. | 285/4 |
| 1,258,884 | 3/1918 | Fife | 285/4 |
| 1,951,645 | 3/1934 | Boosey | 285/4 X |
| 2,021,745 | 11/1935 | Pfefferle et al. | 285/3 X |
| 3,169,786 | 2/1965 | Cator | 285/3 |
| 3,470,893 | 10/1969 | Nelson | 285/3 X |

Primary Examiner—Henry T. Klinksiek
Attorney, Agent, or Firm—Robert G. Hirons

[57] ABSTRACT

A floor drain fitting adapted to be mounted flush with a floor and connected beneath with a drain pipe of one of several different types, comprises a flange, a generally cylindrical body, and an inwardly extending lip at the other end of the cylindrical body. The lip can be removed immediately prior to installation by striking it, to adapt the drain fitting to alternative uses.

1 Claim, 4 Drawing Figures

ADJUSTABLE DRAIN FITTING

FIELD AND BACKGROUND OF THE INVENTION

This invention relates to drain fittings. More particularly, the invention relates to drain fittings whereby a floor drain can be connected easily and simply to a plastic or cement drain pipe for leading liquid away from the floor drain.

In the plumbing industry, there is more and more incentive to replace pipes and fittings traditionally made of metal with those made of cheaper materials, particularly of plastic and cement materials. However, there are circumstances in which metal parts continue to be used, either on account of the inherent properties of the metal or because building codes require the use of metal parts at certain locations.

The common trade practice has been to connect piping and drain fittings such as roof drains and floor drains, to the drainage piping with a joint, commonly referred to as an inside caulked joint. The connecting pipe is inserted a short distance into the lower opening of the drain body. The configuration of the drain body at the pipe connection is such that there is a recess formed between the outside of the pipe and the inside of the drain body. The bottom of the recess has an inwardly projecting flange which fits tightly against the pipe. Oakum is rammed tightly into the bottom of the recess until approximately ⅓ of the recess is filled. Molten lead is then poured on top of the Oakum and when solidified, the lead is hammered or caulked tight in the recess.

Recent advances in the trade have provided new types of connections for metal pipe as well as new types of piping. One of the now popular types of connections comprises a metal band with a rubber gasket and screw tighteners. The pipe ends are inserted into the band and the screws are tightened. Another method was to thread the drain body and connect to it a threaded pipe nipple.

While the pipes and associated connecting parts can be of plastic or cement materials, the drain fitting itself is desirably of metal (cast iron or steel normally) since it is exposed and must withstand blows and pressure. Problems then arise as to simple, convenient and efficient means for connecting plastic or cement pipes to metal drain fittings in a liquid-tight manner.

SUMMARY OF THE INVENTION

The present invention provides a floor drain fitting which can be used with metal, cement or plastic pipes, following only minor adjustments which can be made on site, during installation by unskilled workmen. The drain fitting comprises an annular flanged portion integral with and extending outwardly from one end of a cylindrical portion. The cylindrical portion is provided at its other end with an inwardly extending annular lip which is integral with the drain fitting and which is detachable therefrom, to adapt the drain fitting to different applications. By means of the invention, there is provided a floor drain fitting which is readily made in a one piece metal casting, the same unit being useful with a variety of different types of pipe. The builder or supplier need therefore only carry a selection of different sizes of floor drain fitting of this type, and need not stock a selection of different types and different sizes of each type, in order to be equipped to install floor drains with metal, plastic or cement pipes.

DESCRIPTION OF PREFERRED EMBODIMENTS

An embodiment of the invention, and its various methods of use, is illustrated in the accompanying drawings, in which.

In the drawings, like reference numerals indicate like parts.

Figure 1:
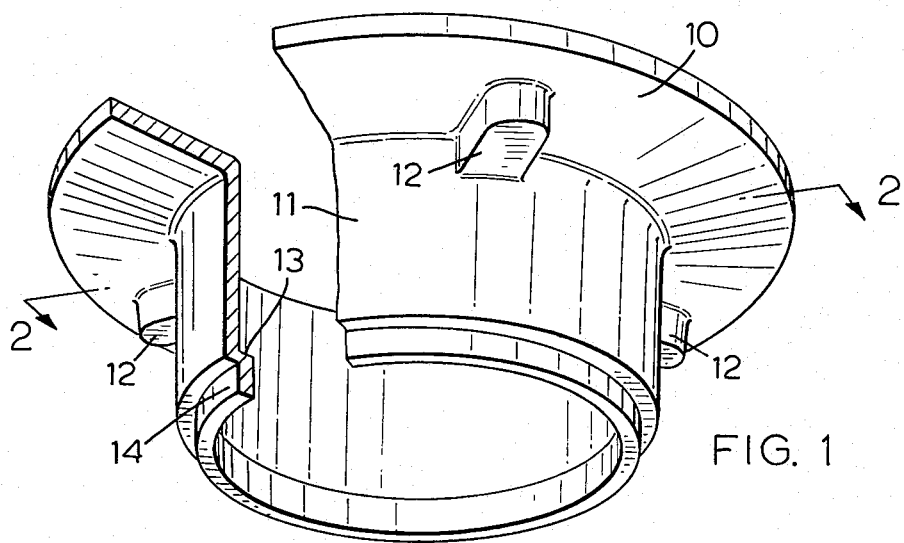
FIG. 1 is a perspective view, partly cut away, of a floor drain fitting according to the invention.

With reference to FIG. 1, the floor drain fitting of the invention comprises an annular flange 10 integral with and extending outwardly from one end of a generally cylindrical portion 11. In one preferred embodiment, the walls of the cylindrical portion 11 diverge at a small angle, in an upward direction. Various integral reinforcing elements 12 are provided at the boundary of the flange 10 and cylindrical portion 11. At its lower end, away from flange 10, the cylindrical portion 11 has an integral, inwardly extending annular lip which has a radial part 13 and an axial part 14. The thickness of the parts is so arranged that the axial thickness of the radial part 13 of the lip is less than the thickness of any of the other parts of the floor drain fitting. The floor drain fitting as illustrated is a one piece metal casting, suitably of cast iron. The arrangement and respective thicknesses of the parts are such that if the floor drain fitting is laid on a firm surface with flange 10 downwards, and is struck with a sharp blow, e.g. with a hammer, on the axially presented face of lip 13, 14, the lip will break off across the radial part 13, leaving a substantially continuous protrusion free inner surface on cylindrical portion 11. The radial part 13 of the lip is however sufficiently rigid and firmly attached to the cylindrical portion 11 initially that the floor drain fitting can be used in normal installations with the lip attached, when required. The lip will not break away without its being struck sharply as described.

Figure 2:
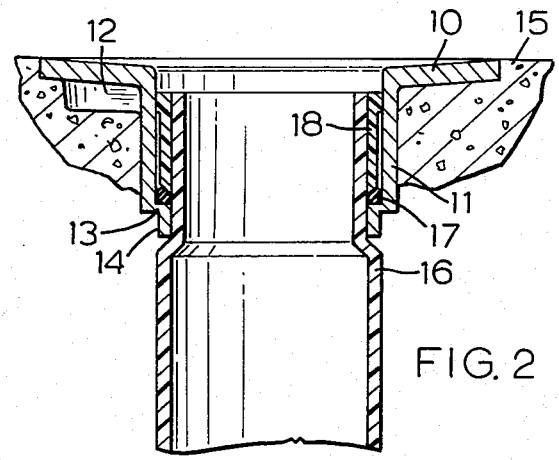
FIG. 2 is a vertical cross section, on the line 2—2 of FIG. 1 of the floor drain fitting of FIG. 1, installed in a floor or roof and having attached thereto plastic pipe section and associated parts.

FIG. 2 shows one form of use of the unmodified floor drain fitting of FIG. 1. The drain fitting is mounted in a concrete or the like floor, roof, decking or the like surface 15 which requires drainage. The flange 10 is mounted substantially flush with the surface of the floor 15, so as not to provide an obstruction thereon. The lip 13, 14, remains part of the floor drain fitting in this installation. A plastic pipe section 16 protrudes upwardly through an aperture defined by lip part 14. An annular compressible sealing ring 17 is seated on the upper surface of lip part 13, surrounding pipe section 16. A cylindrical collar 18 is driven down in the annular space between the cylindrical portion 11 of the drain fitting and the pipe section 16 to compress the sealing ring and effect seal between the plastic and metal parts. The collar 18 is secured in position, e.g. by solvent bonding or spot welding, to the pipe section 16 after installation. This particular form of plastic/metal pipe connection, which utilises the inwardly extending lip 13, 14 on the drain fitting, and the advantages thereof, are more fully described in my copending application U.S. Ser. No. 334,113, filed Feb. 20, 1973, now U.S. Pat. No. 3,809,411.

Figure 3:
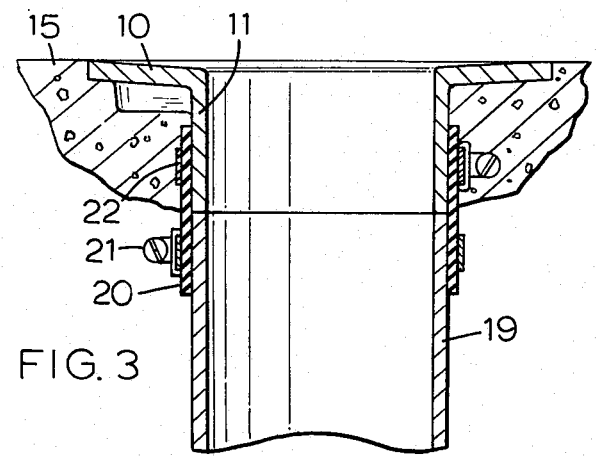
FIG. 3 is a view as FIG. 2, but showing the floor drain fitting, after modification, installed and having connected thereto metal pipe.

FIG. 3 shows another use of the floor drain fitting. As in FIG. 2, the drain fitting is mounted in a floor, etc. 15 with the flange 10 substantially flush with the surface thereof. The lip 13, 14 has been removed. A length of metal pipe 19 is mounted in abutting communicating relationship with the bottom of cylindrical portion 11, by means of a cylindrical collar 20 and circumferential clamping means 21, 22. It will be noted that metal pipe 19 has substantially the same internal diameter as cylindrical portion 11. By removal of lip 13, 14 from the drain fitting, such a sized metal pipe is used without there being an obstruction to flow through, or a reduction in the diameter of pipe used, as compared with the diameter of cylindrical part 11. In the alternative, the lip 13, 14 can be left on, and the metal pipe 19, of the same internal diameter, fitted and secured around part 14 of the lip. In such case, however, lip part 13 provides an obstruction.

Figure 4:
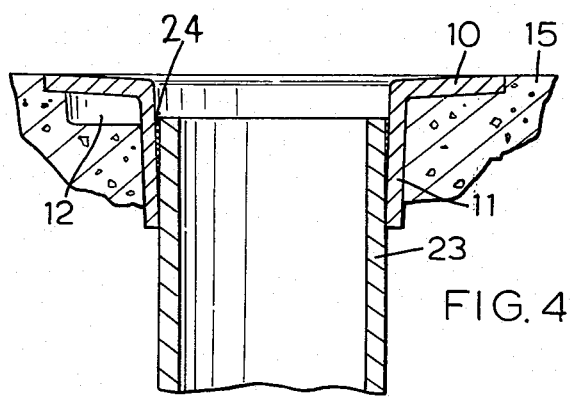
FIG. 4 is a view as FIG. 2, but showing the floor drain fitting, after modification, installed and having connected thereto asbestos cement pipe.

FIG. 4 shows another use of the floor drain fitting. As in FIGS. 2 and 3, the drain fitting is mounted in a floor, etc. 15 with the flange 10 substantially flush with the surface thereof. The lip 13, 14 has been removed. A length of asbestos cement pipe 23 is mounted inside the cylindrical portion 11. The cylindrical walls of portion 11 are divergent in an upward direction at a small angle, so that a small space is left between cylindrical portion 11 and pipe 23 for receiving caulking cement 24, to cement the drain fitting and the pipe together, in the well-known way. A particular problem with asbestos cement pipes is that there is a certain minimum wall thickness below which they do not have sufficient strength. This means that asbestos cement pipes of small exterior diameter must have very small interior diameter, because of this necessary minimum wall thickness. Also asbestos cement pipes cannot be satisfactorily made in complicated shapes, as in the case of plastic pipes. It is therefore of great advantage to be able to use, with a straight asbestos cement pipe, a floor drain fitting having a substantially smooth, continuous internal cylindrical surface to receive the end of the pipe and to provide a large surface area of contact therebetween, for cementing. In accordance with the present invention, this is accomplished as shown in FIG. 4, by the floor drain fitting 10, 11 from which the lip 13, 14 has been removed, by administering thereto a sharp blow prior to installation. Thus an asbestos cement pipe of external diameter corresponding to that of the internal diameter of the cylindrical portion 11 of the drain fitting can be used, rather than one of external diameter corresponding to that of the aperture defined by axial lip part 14.

The present invention thus provides a floor drain fitting which is sufficiently versatile to allow its use with plastic, metal and asbestos cement pipes. All that needs to be done to adapt it to its specific use is to remove the lip part when desired, by striking, which of course can readily be accomplished on a building site by unskilled workmen, immediately before installation. The floor drain fitting is readily made as a one piece casting of metal. The removability of the lip is simply accomplished by making the radially extending part of the lip thinner than the rest, i.e. building in a point of weakness at the desired location. A plumber, builder or supplier can thus stock floor drain fittings solely of this design, and they can be purchased and used in all of the various applications, with all the attendant simplification of inventory, ordering procedures and the like.

I claim:

1. A floor drain fitting adapted to be mounted flush with a floor and to be connected with a drain pipe of one of several different types extending below the floor, said drain fitting comprising a generally cylindrical portion, an annular flanged portion integral therewith and extending radially outwardly from one end of said cylindrical portion, an annular lip integral therewith and extending radially inwardly from the other end of said cylindrical portion, said annular lip having a radial part adjoining the generally cylindrical portion and an axial part integral with the radial part, the axial thickness of said radial part of the annular lip being less than the thickness of the other parts of the drain fitting, thereby rendering said lip detachable from the cylindrical portion on impact administered to said lip, to leave a substantially continuous protrusion free inner surface on the cylindrical portion at said other end.

* * * * *